Dec. 20, 1966   R. E. MUSGROVE ETAL   3,293,004
PROCESS FOR SOLVENT EXTRACTION STRIPPING
Filed Feb. 25, 1963
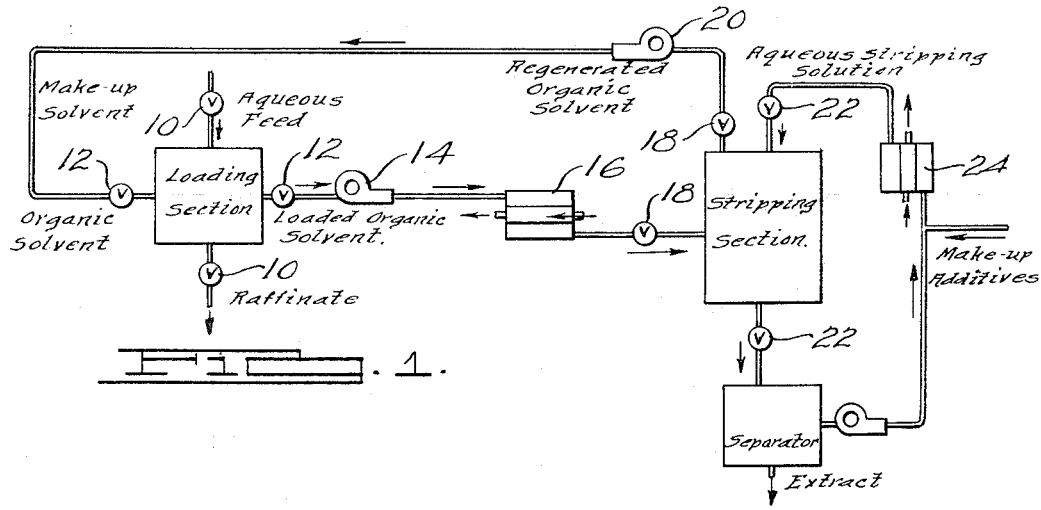
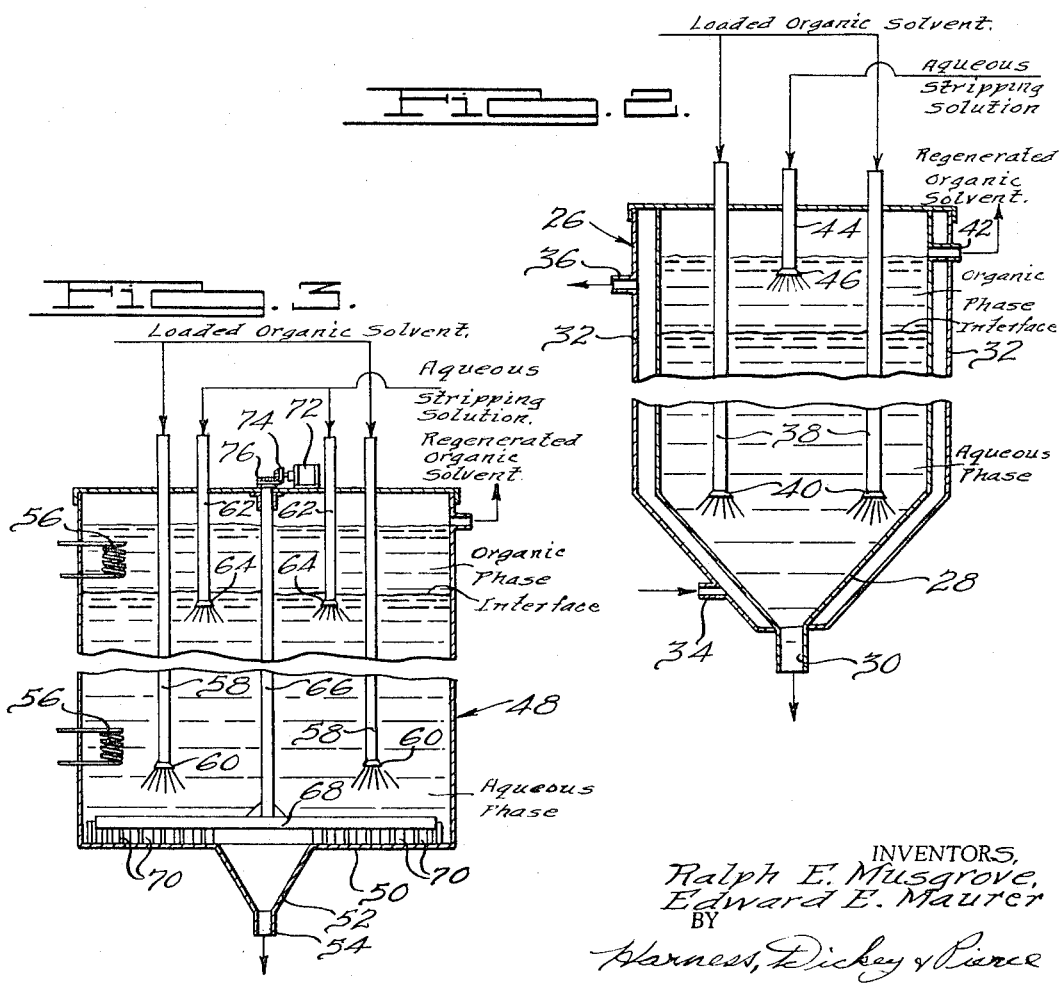
INVENTORS,
Ralph E. Musgrove,
Edward E. Maurer
BY
Harness, Dickey & Pierce
ATTORNEYS.

United States Patent Office 3,293,004
Patented Dec. 20, 1966

3,293,004
PROCESS FOR SOLVENT EXTRACTION
STRIPPING
Ralph E. Musgrove and Edward E. Maurer, Grand Junction, Colo., assignors to American Metal Climax, Inc., New York, N.Y., a corporation of New York
Filed Feb. 25, 1963, Ser. No. 260,491
3 Claims. (Cl. 23—327)

The present invention broadly relates to an improved method and apparatus for stripping the extracted constituents from an organic solvent. More particularly the present invention is directed to the liquid-to-liquid extraction of valuable metals from aqueous liquors by an organic solvent and subsequent stripping of the extracted metals from the solvent in the form of aqueous insoluble salts. More specifically, the invention is directed to an improved continuous method and apparatus for stripping valuable metals such as vanadium, uranium, scandium, tungsten, and the like from organic extract solvents enabling efficient recovery of the precipitated compounds of the metals in comparatively pure form.

A variety of processes have theretofore been used or proposed for use which employ an organic solvent for extracting a selected chemical compound or compounds from a liquor containing relatively dilute concentrations of the selected compounds followed thereafter by a stripping operation of the solvent to recover the extracted chemical compound or compounds therefrom. In processes of this general type economic considerations dictate that the efficiency of both the extraction and stripping operations be relatively high to economically justify the treatment and recovery of such relatively small concentrations of selected chemical compounds. Moreover, it is most desirable that the stripping and extraction operations be conducted on a continuous cycle as opposed to a batch process and that the equipment employed be relatively small avoiding high pumping requirements of the several solutions and solvents and excessive capital expenditures for equipment.

It has been conventional heretofore to strip an extracted chemical compound from an organic solvent by employing an aqueous solution containing reactive constituents therein by forming a continuous phase of the organic solvent and a discontinuous phase of the aqueous stripping solution. Conventionally, the continuous organic phase is vigorously agitated with the discontinuous aqueous phase in order to assure initmate contact between the two phases effecting a reaction and the extraction of the dissolved compound from the organic solvent by the aqueous stripping solution. This practice has, in many instances, resulted in the formation of relatively stable emulsions which are difficult to break within a reasonable time into their respective aqueous and organic phases. In those instances wherein the chemical compound or compounds extracted from the organic solvent form crystallites or fine sized solid precipitates, it has been found that the growth of the precipitate particles is inhibited within the continuous organic phase and remain suspended therein. The high surface activity of the fine sized particles and their high mobility through the organic phase frequently results in their deposition on the surfaces of the equipment effecting a substantial growth of insoluble precipitated material thereon effecting a fouling of the apparatus and detracting from it operating efficiency. It is, accordingly, necessary to discontinue operations at frequent intervals to enable the tedious, time-consuming and costly removal of the accretion of precipitated solids from the equipment surfaces.

The foregoing problem is particularly pronounced in the benefication and extraction of metals such as vanadium, uranium, scandium, tungsten, and the like, from aqueous leach liquors by suitable organic solvents which are thereafter stripped by aqueous stripping solutions forming precipitates of the metallic compounds of these metals. The deposition of the fine-sized crystallites from the continuous organic phase on the surfaces of the equipment constitutes a serious problem causing a substantial reduction in the efficiency of recovering the extracted metallic compounds from the solvent which conventionally is recycled back to the extraction or loading section in which some of the entrained crystallites are dissipated in the raffinate of the aqueous feed liquor being extracted.

It is, accordingly, a primary object of the present invention to provide a novel method and apparatus for overcoming the problems and disadvantages associated with stripping methods and apparatuses of similar type heretofore known.

Another object of the present invention is to provide an improved method for stripping selected chemical compounds from an organic solvent employing a discontinuous organic phase and a continuous aqueous phase which effects precipitation of the stripped chemical compound in the aqueous phase promoting thereby a more rapid crystal growth and settling of the aqueous insoluble precipitate thereby minimizing the precipitation of fine-sized crystallites or particles from the organic phase on the equipment surfaces and loss of such fine-sized particles by entrainment in the solvent effluent.

Still another object of the present invention is to provide an improved method and apparatus for achieving a relatively high efficiency in the stripping of dissolved chemical compounds from a discontinuous organic phase and the recovery thereof in the form of a solid precipitate in a continuous aqueous phase which necessitates only relatively simple equipment and controls to achieve satisfactory operation and relatively small sized equipment and flow rates to achieve a large stripping capacity.

A further object of the present invention is to provide an improved method for stripping dissolved chemical compounds from an organic solvent employing an aqueous stripping solution and which method is simple and economical to control and operate and provides for a substantial increase in the economy of liquid-to-liquid stripping operations.

The foregoing and other objects and advantages of the present invention are achieved by providing a continuous flow of an organic solvent loaded with an extracted chemical compound or compounds which is discharged into the lower stratum of a column of an aqueous stripping solution achieving intimate contact therebetween. The organic solvent is permitted to rise through the aqueous phase and is retained in the form of a floating column on the top of the aqueous column and is withdrawn therefrom at substantially the same rate as the solvent is discharged into the aqueous column. The aqueous treating solution is continuously withdrawn from the base of the aqueous column along with any insoluble precipitated chemical compound formed, and make-up aqueous stripping solution is continuously added to the upper end of the aqueous column in an amount corresponding to the rate at which it is withdrawn from the base thereof.

Other objects, features and advantages of the present invention will become apparent from the subsequent description, taken in conjunction with the accompanying drawings wherein:

FIGURE 1 is a schematic flow diagram of a typical process employing a stripping section embodying therein the principles of the present invention;

FIG. 2 is a diagrammatic vertical sectional view of one embodiment of a stripping apparatus for effecting the stripping of a dissolved chemical compound from an organic solvent utilizing a conical base for effecting gravitational removal of precipitated insoluble material formed; and FIG. 3 is a diagrammatic vertical sectional view of an alternate satisfactory stripping apparatus for continuously stripping a selected chemical compound from an organic solvent which employs a rotary rake mechanism for conveying the precipitated insoluble particles toward the discharge outlet in the base thereof.

Referring now in detail to the schematic flow diagram as shown in FIGURE 1, an arrangement is illustrated that provides for the continuous extraction of a selected chemical compound or compounds from an aqueous feed liquor by an organic solvent followed thereafter by a continuous stripping of the extracted chemical compound from the solvent in a stripping section operated in accordance with the method and apparatus comprising the present invention. The flow diagram as shown is particularly applicable for a liquid ion exchange extraction and stripping operation suitable for use in the recovery of valuable metallic compounds from aqueous leach liquors and the like.

As shown in FIGURE 1, the aqueous feed liquor is continuously fed to a loading section in which an organic solvent of a controlled composition is continuously fed for selectively extracting the desired chemical compound or compounds in the feed liquor. The extracted raffinate such as a metal barren waste liquor is continuously withdrawn from the loading section at a flow rate corresponding to the input rate of the feed liquor as controlled by flow control devices such as valves 10. The loaded organic solvent containing the extracted metal compound therein is continuously withdrawn from the loading section at a rate corresponding to its input as controlled by suitable flow control devices such as valves 12. The loaded organic solvent is pumped from the loading section by a suitable pump 14 to the stripping section. When temperature influences the efficiency of the stripping of the loaded organic solvent, a suitable heat exchanger 16 can be employed for preliminarily heating or cooling the loaded organic solvent to within a prescribed temperature range prior to its discharge into the stripping section.

An aqueous stripping solution is concurrently discharged into the stripping section which is intimately contacted with the loaded organic solvent effecting a stripping of the chemical compound or compounds from the solvent. The stripped or regenerated organic solvent is thereafter withdrawn from the stripping section at a rate corresponding to its input as controlled by flow control devices such as valves 18 and is pumped by means of a suitable pump 20 back to the loading section. Suitable makeup solvent and solvent additives can be added to the regenerated organic solvent to replenish that which is lost or consumed during the extraction and stripping steps.

The aqueous stripping solution is withdrawn from the stripping section at a flow rate corresponding to its input rate as controlled by flow control devices such as valves 22. The loaded aqueous stripping solution thereafter passes into a settler or separator such as a filter or centrifuge, for example, in which the extracted chemical compound or compounds are removed and the stripping solution is thereafter recycled back to the stripping section. In those instances where the stripped compound is soluble in the aqueous stripping solution, the stripped compound can be removed therefrom by any one of a number of techniques well known in the art. More usually, the stripped compound forms an aqueous insoluble precipitate which can simply be removed from the stripping solution by settling or filtration, if desired. The extract is withdrawn from the separator and further refined, if necessary, to achieve the desired resultant product. A suitable heat exchanger 24 can be provided for heating or cooling the recycled aqueous stripping solution to within a controlled temperature range to achieve optimum stripping efficiency. Suitable makeup aqueous stripping solution and additives can be added to the recycled stripping solution to maintain it within a controlled composition range and to replenish any loss or evaporation of the solution during the stripping operation.

It will be apparent from the foregoing description taken in conjunction with the schematic flow diagram as shown in FIGURE 1 that the process disclosed provides for continuous extraction and stripping of the respective solutions and solvents providing therewith a continuous recovery of the chemical compound extracted. The particular construction and mechanism present in the stripping section will now be described with particular reference to FIGURES 2 and 3. As shown in FIGURE 2, a tank or vessel 26 is provided having a lower conical section 28 which is formed at the lowermost point thereof with an outlet 30 for withdrawing the loaded aqueous stripping solution and the entrained aqueous insoluble precipitate of the extracted chemical compound. The exterior walls of the tank 26 may be provided with a suitable jacket 32 provided with an inlet 34 and an outlet 36 for circulating a heating or cooling medium therethrough to facilitate the maintenance of a controlled temperature of the organic phase comprising the organic solvent and the aqueous phase comprising the aqueous stripping solution. The heating or cooling jacket 32 may be employed in lieu of the heat exchangers 16 and 24 as shown in FIGURE 1 or in combination therewith to provide for the proper temperature control of the liquids in the stripping vessel.

The loaded organic solvent containing the dissolved extracted chemical compound or compounds therein is discharged into the lower portion of an aqueous column comprising the continuous aqueous phase of the aqueous stripping solution in the form of a pressurized fine spray through conduits 38 having nozzles 40 at the outlet ends thereof. The fine-sized droplets or globules of the loaded organic solvent discharged from the nozzles 40 are immediately disposed in intimate contact with the aqueous stripping solution effecting a coreaction or extraction across the interface therebetween whereby a transfer of the chemical compound or compounds occurs from the organic solvent to the aqueous stripping solution. The stripping of the solvent continues as the globules or droplets rise upwardly through the continuous aqueous phase as a result of the lower specific gravity of the organic solvent until they merge with and become a part of a floating column of a continuous organic phase comprising the regenerated organic solvent from which substantially all of the chemical compound or compounds have been stripped. The height of the upper surface of the organic column is controlled by an overflow outlet 42 from which the regenerated organic solvent is removed at a rate corresponding substantially to the rate at which the loaded organic solvent is discharged from the conduits 38.

The level of the bottom of the organic column or interface between the organic phase and the aqueous phase is controlled by the rate of withdrawal of the aqueous stripping solution from the outlet 30 and the rate of input of the recycled aqueous stripping solution through a conduit 44 provided with a nozzle 46 for discharging the stripping solution in the form of a fine spray into the upper region of the continuous organic phase. The discharge of the aqueous stripping solution into the upper stratum of the continuous organic phase effects a scavenging of any residuary crystallites of the chemical compound or compounds in the barren stripped or organic solvent which were mechanically entrained by the solvent and were not removed during the course of travel of the organic solvent in minute droplet form through the continuous aqueous phase.

The tank 26 as shown in FIG. 2 is preferably constructed so the ratio of its height relative to its diameter is relatively large providing therewith an aqueous column of a height sufficient to provide a residence time of the upwardly traveling organic droplets through the aqueous phase that assures substantially complete stripping of the chemical compound or compounds from the solvent. An experimental stripping vessel having an inside diameter of 14 inches, an overall height of 134 inches, $$(H:D=9.7:1)$$

has provided efficient stripping of an organic solvent. The organic solvent was discharged into the aqueous phase at a depth of 80 inches from the top and the organic column or phase was controlled to a depth of about 42 inches over an aqueous column of about 88 inches. The aqueous stripping solution was sprayed into the organic column at a depth of 12 inches below the upper level of the organic column.

An alternate satisfactory embodiment of a stripping vessel is illustrated in FIGURE 3 which operates on substantially the same principle as that previously described in connection with the apparatus shown in FIGURE 2 and is particularly applicable for handling aqueous insoluble stripped compounds. As shown in FIGURE 3, a tank or vessel 48 is provided which is formed with a substantially flat bottom 50 having a conical section 52 disposed centrally thereof which is provided with an outlet 54 for withdrawing the aqueous stripping solution and the precipitate of the chemical compound or compounds therefrom. An alternate arrangement for controlling the temperature of the organic phase and the aqueous phase in the stripping tank 48 is illustrated comprising a plurality of immersion heaters or coolers 56 which are disposed at selected intervals to provide the requisite heat exchange. The immersion heaters or coolers 56 can be employed in lieu of or in conjunction with the heat exchangers 16 and 24 as illustrated in FIGURE 1 for controlling the temperature of the organic phase and aqueous phase.

The loaded organic solvent is introduced into the tank 48 in a manner similar to that described in connection with FIGURE 2. As shown in FIGURE 3, the organic solvent is discharged into the lower region of the continuous aqueous phase through a pair of conduits 58 provided with nozzle 60 at the lower ends thereof in the form of a fine spray. The aqueous stripping solution in contrast to the arrangement previously described is discharged directly into the upper region of the continuous aqueous phase through a pair of conduits 62 provided with nozzles 64 in the form of a fine spray. While the discharge of the aqueous stripping solution below the interface of the organic-aqueous phases also enables the attainment of the benefits of the present invention, the benefits of the scavenging and washing effect on the organic phase is not obtained as is achieved by the nozzle 46 arrangement as shown in FIG. 2. This fact requires the use of larger processing equipment to achieve the same efficiency as obtained in the stripping vessel shown in FIG. 2 or the use of a chemical system in which the solubility of the crystals in the stripping solution is very low and the exchange of the metallic compound or compounds from the organic to aqueous phase is very rapid. In view of the foregoing, it is preferred to locate the discharge outlet of the aqueous stripping solution in the upper stratum of the organic phase in a manner as shown in FIGURE 2.

As shown in FIGURE 3, when the stripped chemical compounds form insoluble precipitates which grow in size in the continuous aqueous phase and settle on the bottom of the tank 48, a suitable rotary rake mechanism is provided for conveying the precipitate radially inwardly across the bottom 50 to the conical section 52 in which it drops by gravity out through the outlet 54. The exemplary rake mechanism shown in FIGURE 3 comprises a shaft 66 extending centrally and downwardly of the tank 48 which is rotatably journaled in the top thereof. A cross bar 68 is securely fastened to the lower end of the shaft 66 which is provided with a plurality of angularly inclined scraper blades 70 depending from the lower side thereof that are adapted to transfer the precipitated solid material inwardly from the periphery of the bottom 50 toward the conical section 52. The shaft 66 can be rotated by a suitable power source such as a motor 72 mounted on the top of the tank 48 which is provided with a driving gear 74 on the output shaft thereof disposed in constant meshing relationship with a driven gear 76 affixed to the projecting end of the shaft 66. In accordance with this construction, the continuous stripping of the loaded organic solvent forms a continuous precipitate which settles on the bottom of the tank and is continuously conveyed by the scraper mechanism toward the outlet 54.

As hereinbefore set forth the process and apparatus comprising the present invention is particularly applicable for the extraction of valuable metal compounds by liquid ion exchange extraction and stripping processes. As an example of such an operation, a description is hereinafter provided of the recovery of vanadium from salt roast acid leach liquors. In such acid leach liquors the vanadium constituent is present predominantly in the form of divalent or tetravalent polymers of petavalent vanadium anions, such as pyrovanadate $(H_2V_2O_7)^{-2}$; hexavanadate $(H_2V_6O_{17})^{-2}$; decavanadate $(H_2V_{10}O_{17})^{-2}$; pyrovanadate $(H_2V_2O_8)^{-4}$; tetravanadate $(H_2V_4O_{13})^{-4}$; octavanadate $(H_2V_8O_{23})^{-4}$; and decavanadate $(H_2V_{10}O_{28})^{-4}$. To effect an extraction of the vanadium ion or other desired metal ion species, an organic solvent is employed incorporating an active extractant which is adapted to react with and form a complex with the ion rendering it soluble in the organic solvent and insoluble in the aqueous leach liquor. Other suitable additives can be incorporated in the organic solvent if desired, for the purposes of increasing the phase disengagement between the organic solvent and aqueous leach liquor and/or to increase the solubility of the organic complex formed with the metal ion extracted in the organic solvent. The solvent itself may comprise any suitable organic liquid such as kerosene or fuel oil, for example, which has a relatively high solubility for the organic complex formed with the metallic ion extracted.

The active extractant in the organic solvent may comprise any one of a number of suitable complexing agents which are adapted to combine with selected metallic ion species forming complex compounds having organic characteristics which enables their solution in the organic solvent and rendering them substantially insoluble in the aqueous liquor. Complexing agents suitable for this purpose include tertiary amines and quaternary ammonium compounds which have been found to provide selectivity as to the specific type of metal ion species to be extracted by forming complexes therewith which can be readily decomposed during the subsequent aqueous stripping operation of the solvent. The specific active extracting agent employed will depend on the particular metal ion species to be extracted as well as considerations of the types and concentrations of other metallic ions present and the acidity or alkalinity of the liquor to be extracted. Quaternary ammonium chloride compounds have been particularly suitable for effecting extraction of vanadium and other metals from various acidic and alkaline aqueous liquors. A commercially available high molecular weight water insoluble quaternary ammonium chloride compound suitable as an extractant reagent comprises tricaprylyl methyl ammonium chloride which is commercially designated as Aliquat 336 and is available from General Mills, Inc.

A typical solvent composition which has been found particularly suitable for extracting vanadium anions from aqueous liquors comprises a mixture of about 92% kerosene and about 4% of a quaternary ammonium chloride compound (Aliquat 336) in addition to about 4% isodecanol which enhances the solubility of the vanadium ion complex formed in the organic solvent. The organic solvent is intimately admixed with the aqueous feed liquor containing the vanadium anion to be extracted whereby a reaction occurs between the quaternary ammonium chloride compound and the vanadate ion forming an organic complex which is insoluble in the aqueous feed liquor and soluble in the organic solvent. A typical complexing reaction between a quaternary ammonium chloride extracting agent and sodium decavanadate is graphically illustrated as follows:

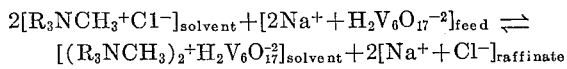

The sodium and chloride ions formed during the extraction operation remain in the raffinate and the organic complex of the decavanadate is removed from the loading section to the stripping section.

For reversing the organic complexing reaction, the aqueous stripping solution contains suitable stripping additives which are adapted to react with the complex formed effecting a regeneration of the quaternary ammonium chloride compound and an organic insoluble vanadium compound which also preferably is aqueous insoluble such that it forms a precipitate and can subsequently be removed from the aqueous stripping solution. For stripping the quaternary ammonium complex of the decavanadate from the organic solvent, an aqueous stripping solution comprising the solution of ammonium chloride which additionally preferably contains free ammonia to adjust the pH of the aqueous stripping solution to a range of from about 8.3 to about 8.5. Aqueous stripping solutions containing about 200 grams per liter of ammonium chloride have been found extremely satisfactory for stripping the decavanadate complex from the organic solvent. Optimum stripping results are obtained when the solvent containing the complex vanadium compound is maintained at a temperature of from about 150° to about 160° F.

The discharge of the organic solvent into the continuous aqueous phase of stripping solution in accordance with the stripping apparatus shown in FIGURES 2 and 3 effect an immediate reaction between the ammonium chloride constituent in the stripping solution and the complex vanadium anion in the solvent across the interface therebetween forming ammonium metavanadate and regenerating the quaternary ammonium chloride compound. The stripping reaction can be chemically described as follows:

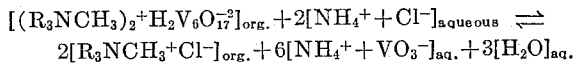

The ammonium metavanadate formed is grossly insoluble in the ammonium chloride-ammonia stripping solution effecting immediate precipitation and crystallization thereof. A sufficient degree of solubility however does exist enabling migration of the ions in a degree typical of crystal growth. The crystals formed progressively grow whereby they settle by gravity through the aqueous continuous phase to the base of the stripping tank from which they are subsequently removed. The organic solvent with the regenerated quaternary ammonium chloride compound is recycled back to the loading section in a manner as previously described.

It will be appreciated from the foregoing that any desired metallic ions can be efficiently extracted from aqueous feed liquors which are amenable to the formation of insoluble precipitates in the aqueous phase of the stripping section by employing the appropriate selective extractant agent in the organic solvent and the appropriate additives in the aqueous stripping solution.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of stripping organic soluble quaternary ammonium complexes of vanadium compounds from an organic extract solvent which comprises the steps of maintaining a vertical column of an aqueous stripping solution containing about 200 grams per liter of ammonium chloride and sufficient free ammonia for maintaining the pH of the stripping solution within a range of from about 8.3 to about 8.5, spraying said solvent in the form of droplets into said aqueous column near the lower end thereof effecting a reaction between the quaternary ammonium vanadium complex and the ammonium chloride forming an aqueous insoluble vanadium salt precipitate and regenerating the quaternary ammonium complexing agent, maintaining a floating layer of said solvent on the top of said aqueous column, withdrawing said organic solvent continuously from said layer, withdrawing said aqueous solution and said precipitate from the lower end of said aqueous column, and spraying make-up aqueous solution into the upper stratum of said organic layer.

2. The method as described in claim 1 wherein said quaternary ammonium complexing agent consists of tricaprylyl methyl ammonium chloride.

3. The method of stripping metal complexes of metals selected from the group consisting of vanadium, uranium, scandium, tungsten, and mixtures thereof, and complexing agents selected from the group consisting of tertiary amines, quaternary ammonium compounds, and mixtures thereof, from an organic extract solvent in which the metal complexes are dissolved, which comprises the steps of maintaining a vertical column of an alkaline aqueous stripping solution containing an ammonium uncomplexing salt dissolved therein, continuously spraying said solvent in the form of droplets into said aqueous column near the lower end thereof effecting a reaction between the metal complex and the ammonium uncomplexing salt and simultaneously forming an aqueous and organic insoluble precipitate of the metal and a regeneration of the complexing agent, maintaining a floating layer of said solvent on top of said aqueous column, withdrawing said organic solvent continously from said layer, continuously withdrawing said aqueous solution and said precipitate from the lower end of said column, and continuously supplying makeup aqueous stripping solution to said aqueous column in an amount substantially equal to that withdrawn from said lower end of said column.

References Cited by the Examiner

UNITED STATES PATENTS

| | | | |
|---|---|---|---|
| 2,746,846 | 5/1956 | Grunewald et al. | 23—310 |
| 2,759,801 | 8/1956 | Yeager et al. | 23—14.5 |
| 2,831,754 | 4/1958 | Manka | 23—310 |
| 2,873,166 | 2/1959 | Bowen | 23—14.5 |
| 3,052,513 | 9/1962 | Crouse | 23—14.5 |
| 3,083,085 | 3/1963 | Lewis et al. | 23—312 |
| 3,085,864 | 4/1963 | Jealous | 23—270.5 |
| 3,115,388 | 12/1963 | Goren | 23—14.5 |

OTHER REFERENCES

Clegg et al.: "Uranium Ore Processing" (1958), pp. 258–260.

L. DEWAYNE RUTLEDGE, *Primary Examiner.*

CARL D. QUARFORTH, LEON D. ROSDOL,
*Examiners.*

J. D. VOIGHT, A. G. BOWEN, S. TRAUB,
*Assistant Examiners.*